United States Patent Office 2,965,508
Patented Dec. 20, 1960

2,965,508

WATER SOLUBLE THERMOPLASTIC CELLULOSE ETHER COMPOSITIONS

Francis E. Windover, Garth H. Beaver, and Arthur W. Anderson, Midland, Mich., assignors to The Dow Chemical Company, Midland, Mich., a corporation of Delaware No Drawing. Filed May 13, 1958, Ser. No. 734,861

7 Claims. (Cl. 106—189)

This invention relates to water-soluble thermoplastic compositions based on certain cellulose ethers. More particularly it relates to such compositions comprising water-soluble hydroxyalkyl alkyl cellulose ethers which are themselves sufficiently thermoplastic to melt without decomposition.

A method for the fabrication by thermal means of flexible and rigid articles, such as films and sheets, from water-soluble cellulose ethers, has long been desired. It has also been desired to have thermoplastic compositions based on water-soluble cellulose ethers which could be formed by conventional methods into heat-sealable films and sheets. Thermoplastic compositions made from non-thermoplastic water-soluble cellulose ethers have been disclosed, but they require such large amounts of plasticizer that rigid articles cannot be produced except by forming very thick sections. When either films or sheets were desired, it was necessary to cast or to dip the ethers from an aqueous solution, usually containing a small amount of a humectant, and subsequently to evaporate the water. Because of the unique solubility characteristics of most of the cellulose ethers in water, the fabrication of shaped articles from aqueous solutions is very difficult to control. It would be desirable if existing molding and heat sealing equipment and methods could be employed to form such articles.

There are many other considerations for water-soluble, thermoplastic, cellulose ether compositions which are desirable. When the films and sheets are to be used in contact with foodstuffs, every ingredient in the composition must be non-toxic and must be stable in the presence of the foodstuff. All of the ingredients of the composition must be compatible if transparent films and sheets are to be produced.

In view of the above requirements and considerations it would be desirable to have and it is accordingly the principal object of this invention to provide new and improved water-soluble cellulose ethers which are themselves thermoplastic.

It is a further object to provide such compositions which may be formed into articles capable of being heat sealed.

The above and related objects are accomplished by means of compositions consisting essentially of (a) from 2 to 90 percent by weight of a water-soluble thermoplastic hydroxyalkyl alkyl cellulose ether in which the hydroxyalkyl group contains from 1 to 3 carbon atoms and which has a melting point which is at least 10° C. below its decomposition temperature and (b) correspondingly from 98 to 10 percent by weight of a plasticizer consisting of (1) at least 5 percent by weight of a member of the group consisting of glycerol mono-2-hydroxyalkyl ether, glycerol-bis-(2-hydroxyalkyl) ether, and glycerol-tris-(2-hydroxyalkyl) ether wherein each 2-hydroxyalkyl group contains from 2 to 3 carbon atoms and (2) at least 5 percent by weight of a different cellulose ether plasticizer.

The cellulose ethers which are useful in carrying out the invention are those hydroxyalkyl alkyl cellulose ethers in which the hydroxyalkyl groups have from 2 to 3 carbon atoms, the alkyl groups have from 1 to 3 carbon atoms, and which melt at a temperature appreciably below their decomposition temperature, and which are soluble in water and certain organic solvents. Typical examples of useful ethers are the hydroxyethyl methyl and hydroxypropyl methyl ethers of cellulose when etherified to an extent as will be described.

The cellulose ethers may be prepared by known two-step processes, but it is preferred to employ a one-step process. As illustrative of such a process, cellulose is treated with from 30 to 60 percent aqueous caustic soda solution to give an alkali cellulose with a ratio of from 0.7 to 1.5 parts by weight of NaOH per part of cellulose. The alkali cellulose is then mixed with from 1.1 to 2.0 parts of methyl chloride per part of cellulose and with 0.45 to 0.50 part of propylene oxide, or its molar equivalent of ethylene oxide, per part of cellulose at a temperature below 40° C. for a short time, followed by reaction at 60° C. or higher until etherification is substantially complete. The product is washed with hot water at a temperature above its aqueous gel point to remove water-soluble impurities.

Although it is difficult to determine the proportions and amounts of each substituent in a mixed cellulose ether and especially when that there has been prepared by a single step process, it has been found that the cellulose ethers useful in this invention should have from about 7 to 10 percent hydroxypropoxy substitution and from 28 to 30 percent methoxy substitution, or the corresponding equivalent substitution for hydroxyethoxy, ethoxy and propoxy. It is common practice to characterize the ethers by their physical or chemical properties, such as melting point of the ether or gel point of its water solutions. In the case of this invention, the existence of the desired degree of etherification is best determined by measuring the softening, melting and decomposition temperatures of the ether product. Those temperatures are easily determined by using a melting bar which has progressively increasing temperatures along its length. Films of constant thickness are made up and small pieces placed at varying points along the bar. To be useful here, the mixed ethers should have a spread of at least 10 and preferably 20 or more centigrade degrees between melting and decomposition temperatures.

The useful cellulose ethers have gel points in water that are between those of alkyl celluloses and the corresponding commercial hydroxyalkyl alkyl celluloses. For example, the methyl celluloses of commerce have aqueous gel points of from about 45 to 50° C.; the commercial hydroxy propyl methyl celluloses have aqueous gel points above 60° C.; and the cellulose ethers of this invention have gel points of about 55° C. The ethyl derivatives show similar differences in gel points in aqueous solution.

When the thermoplastic ethers of this invention are used, it is possible to use smaller amounts of plasticizer to give a moldable composition than when non-thermoplastic ethers are used.

The useful plasticizers in the compositions of this invention are combinations of the hydroxyalkyl glycerols having from 2 to 3 carbon atoms in each alkyl group together with another cellulose ether plasticizer. It is possible to use the mono-, di-, or tri-substituted glycerols.

As illustrative of the preparation of the glycerol ethers, the method of preparation of mixed (2-hydroxypropyl) glycerol will be described. Into a pressure vessel was placed 1 molar part of glycerine, an amount in slight excess of 3 molar parts of propylene oxide, and 0.3 percent based on the weight of the above reactants of sodium hydroxide as a 50 percent aqueous caustic solution. The vessel was heated to about 100° C. to cause reaction and the vessel cooled externally as the reaction proceeded to assure a constant pressure. When the reaction was completed as indicated by a pressure drop to a constant minimum pressure, the product was drained from the vessel. No further purification was necessary. If desired the sodium hydroxide may be neutralized. In certain instances the product does not have to be dried when prepared in this manner, since the compositions are frequently used in aqueous solution.

The other cellulose ether plasticizer will be known. Typical of such plasticizers are ethylene glycol, propylene glycol, glycerine, tributyl citrate, tributyl acetyl citrate, alkyl lactates, alkyl glycolates, monoethers of polyalkylene glycols, and others. Mixtures of two or more of these may also be employed.

The amount of cellulose ether that may be used in the thermoplastic compositions of this invention may be varied within wide limits between 2 and about 90 percent. It should be apparent that the concentration employed will depend on the properties desired in the finished article, on the method of fabrication, and on the viscosity type of the cellulose ether used. For compression molding and vacuum drawing of sheets, it is possible to use as little as 10 to 30 percent plasticizer, while for applications such as the formation of semi-rigid sheet, it is preferred to use from 5 to 30 percent cellulose ether and from 95 to 70 percent plasticizer. When the compositions are to be cast into flexible films from a solution in an auxiliary solvent, such as water, the plasticizer should be used in an amount of from about 25 to 50 percent of the composition. With the higher viscosity grades of cellulose ether (over 4,000 centipoises as measured from a 2 percent aqueous solution at 20° C.), it is extremely difficult to make concentrated solutions of the ether in plasticizer, and such solutions are too viscous for conventional means of fabrication.

It is well known that the degree of substitution of cellulose ethers giving a minimum softening temperature coincides with that degree of substitution giving maximum organic solubility. However, with the simple alkyl ethers, it is equally well known that as the organic solubility is increased the water solubility is correspondingly decreased. The hydroxyalkyl alkyl cellulose ethers of this invention, however, retain their water solubility as the degree of substitution is increased.

The compositions of this invention may be molded into clear, transparent, water-soluble films. Such films may also be prepared by casting a solution of the composition in water, water and methanol, or benzene and methanol. The films are capable of being sealed to each other using conventional heat sealing equipment.

The advantages of these compositions will be more apparent from the following illustrative examples wherein all parts and percentages are by weight unless otherwise indicated.

*Example I*

Ten parts of a hydroxypropyl methyl cellulose having from 7 to 10 percent hydroxypropoxy substitution and from 28 to 30 percent methoxy substitution and of a viscosity grade of 50 centipoises were added to 90 parts of a plasticizer consisting of 50 percent each of a hydroxypropyl glycerol having an average degree of substitution of 2.5 and propylene glycol. The mass was rendered molten at 190° C. with agitation. A film was cast from the molten plastic mass. The film which was 0.025 inch in thickness set up immediately and when cooled was found to be clear, elastic, non-toxic, and heat sealable at 100° C. Pharmaceutical capsules were made by a conventional vacuum forming technique.

In a similar manner films were prepared from 10 percent of the same cellulose ether, 20 percent of the hydroxypropyl glycerol and 70 percent of propylene glycol. In addition, films were prepared from a mixture consisting of 10 percent of the same cellulose ether, 55 percent of the hydroxypropyl glycerol and 35 percent of glycerine. Similar films also resulted from 10 percent of the same cellulose ether, 80 percent of the hydroxypropyl glycerol and 10 percent glycerine.

In similar manner capsules were prepared when the following plasticizers were substituted for the glycerine in the last described formulation: ethylene glycol, diethylene glycol, dipropylene glycol, ethyl lactate and ethyl glycolate. In addition similar results were observed when the hydroxypropyl glycerol was replaced by the mono- and di-substituted derivatives.

*Example II*

A composition was prepared by mixing 75 parts of the cellulose ether described in Example I with 10 parts of monohydroxypropyl glycerol and 15 parts of propylene glycol. A 12 percent by weight aqueous solution of this mixture was prepared. Films of from 0.001 to 0.003 inch in thickness were cast from the aqueous solution. When dry they were found to be clear, tough, and heat sealable at 150° C. In similar manner solutions of the above composition were made in a solvent consisting of 80 percent methyl alcohol and 20 percent water and in a solvent consisting of 55 percent methyl alcohol, 35 percent benzene and 10 percent water. These solutions were also cast into clear, coherent films.

Similar results were observed when the film-forming solids of the composition consisted of 90 percent of the cellulose ether, 5 percent of the hydroxypropyl glycerol and 5 percent of the propylene glycol.

What is claimed is:

1. A thermoplastic composition consisting essentially of (a) from 2 to 90 percent by weight of a water-soluble thermoplastic hydroxyalkyl alkyl cellulose ether in which the hydroxyalkyl group contains from 2 to 3 carbon atoms and the alkyl group contains from 1 to 3 carbon atoms and which has a melting point which is at least 10° C. below the decomposition temperature, and (b) correspondingly from 98 to 10 percent by weight of a plasticizer consisting of (1) at least 5 percent by weight of a member of the group consisting of glycerol mono-2-hydroxyalkyl ether, glycerol-bis-(2-hydroxyalkyl) ether, and glycerol-tris-(2-hydroxyalkyl) ether wherein each 2-hydroxyalkyl group contains from 2 to 3 carbon atoms and (2) at least 5 percent by weight of another known cellulose ether plasticizer.

2. The composition claimed in claim 1, wherein said known cellulose ether plasticizer is a polyhydroxy aliphatic compound.

3. The composition claimed in claim 2, wherein said polyhydroxy aliphatic compound is glycerine.

4. The composition claimed in claim 2, wherein said polyhydroxy aliphatic compound is an alkylene glycol having from 2 to 3 carbon atoms.

5. The composition claimed in claim 4, wherein said alkylene glycol is propylene glycol.

6. The composition claimed in claim 1, wherein said known cellulose ether plasticizer is an alkyl ether of an alkylene glycol wherein said alkyl and alkylene groups each contain from 2 to 3 carbon atoms.

7. The composition claimed in claim 1, wherein said known cellulose ether plasticizer is a mixture of glycerine and alkylene glycol of from 2 to 3 carbon atoms.

References Cited in the file of this patent

UNITED STATES PATENTS

| | | |
|---|---|---|
| 2,810,659 | Greminger et al. | Oct. 22, 1957 |
| 2,831,852 | Savage | Apr. 22, 1958 |
| 2,835,603 | Swinehart et al. | May 20, 1958 |